W. A. GREENLAW.
ROTARY PIPE JOINT.
APPLICATION FILED JUNE 9, 1910.

993,774

Patented May 30, 1911.

Witnesses:
Nathan C. Lombard
Edna C. Cleveland

Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING CO., OF BOSTON, MASSACHUSETTS, A CORPORATION OF MAINE.

ROTARY PIPE-JOINT.

993,774. Specification of Letters Patent. Patented May 30, 1911.

Original application filed March 19, 1910, Serial No. 550,536. Divided and this application filed June 9, 1910. Serial No. 566,094.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Rotary Pipe-Joints, (said improvements being a division of application Serial No. 550,536, filed March 19, 1910,) of which the following is a specification.

This invention relates to rotary joints and has for its object the provision of a joint of this type in which the two parts may be moved relative to each other with a minimum amount of friction while at the same time thoroughly packed to prevent leakage.

The invention consists in certain novel features of construction and arrangement of parts which will be readily understood by reference to the description of the drawings and to the claims hereinafter given.

Figure 1:
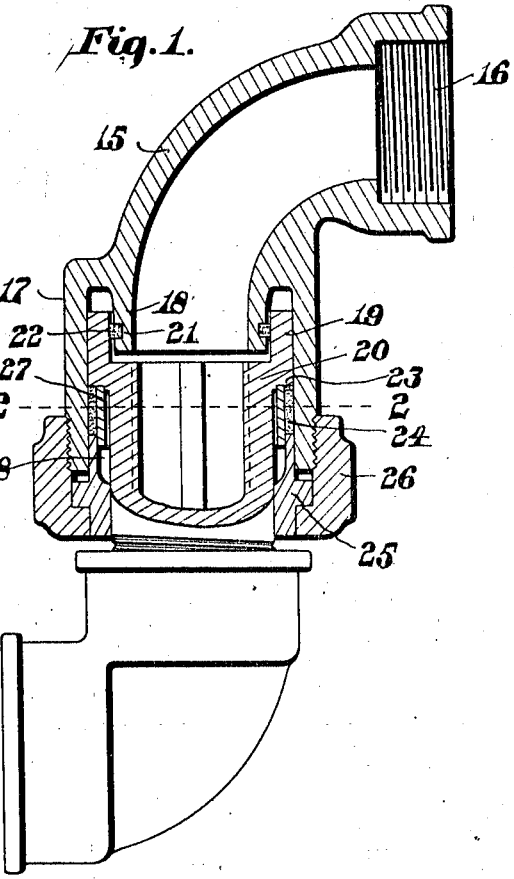
Figure 2:
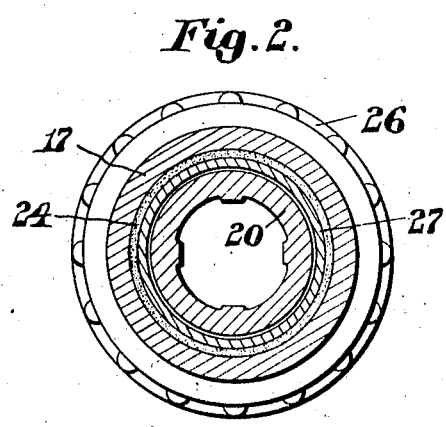

Of the drawings: Figure 1 represents an elevation partly in section of a joint embodying the features of the present invention, and Fig. 2 represents a transverse section of the same, the cutting plane being on line 2—2 on Fig. 1.

Similar characters designate like parts throughout the drawings.

In the drawings, 15 represents a socket pipe member which is provided at one end with a female thread 16 adapted to be secured to the end of a pipe while the opposite end is cup-shaped as at 17 and has formed integrally therewith an annular flange 18 extending toward the outer end of said cup portion 17.

The annular flange 18 extends into the annular flanged extension 19 formed upon the inner end of the male member 20. The outer periphery of this flanged extension 19 contacts with the inner wall of the cup portion 17 but the inner wall of said flanged extension is free from contact with the annular flange 18 which it surrounds. An annular groove 21 is cut into the periphery of the annular extension 18 and has inserted therein a packing 22 which bears against the inner wall of the extension 19 and thoroughly packs the joint between the two members thus preventing any leakage into the bottom of the cup portion 17.

The member 20 is free to rotate within the cup portion 17. The annular extension 19 is of greater diameter than the body part of the member 20 of the joint, thereby forming a radial shoulder 23 against which an annular packing 24 is forced by means of a follower 25 within the outer end of the cup portion 17 and movable therein by means of the nut 26 threaded to the cup portion 17.

The inner end of the wall of the follower 25 is of sufficient diameter to form a recess adapted to receive the end of a ring 27 surrounding the body portion of the member 20 and resting against the radial shoulder 23. This ring 27 is surrounded by the packing 24 which is forced outwardly by means of the follower 25 into contact with the inner wall of the cup portion 17 to thoroughly pack the joint between the rotatable member 20 and the non-rotatable socket member 15.

The ring 27 is retained by the packing 24 in a position concentric to the axis of the rotatable member 20 with its inner wall free from contact with the periphery thereof so that no friction occurs between these two parts during the rotation of the movable member 20.

The end of the ring 27 extending into the recess 28 in the follower 25 fits the inner wall thereof so that the packing is prevented from entering said recess. As the packing wears and the follower is moved toward the radial shoulder 23 the ring 27 will move farther into the recess 28.

It is obvious from an inspection of the drawing that the frictional contacting surfaces between the rotating and non-rotating members are reduced to a minimum while the joints between the two are effectually packed to prevent any leakage from the joint.

It is believed that the operation and many advantages of the invention will be fully understood without further description.

Having thus described my invention, I claim:

1. In a device of the class described, a rotary joint, comprising a socket member having an inwardly extending annular flange; a male member surrounding said annular flange and fitting the inner wall of said socket member, said male member being provided with a radial shoulder; a nut secured to the outer end of said socket member; a packing interposed between said nut and radial shoulder; and an annular member interposed between said packing and the periphery of said male member.

2. In a device of the class described, a rotary joint, comprising a socket member having an inwardly extending annular flange; a male member surrounding said annular flange and fitting the inner wall of said socket member, said male member being provided with a radial shoulder; a nut secured to the outer end of said socket member; a packing interposed between said nut and radial shoulder; and an annular member interposed between said packing and the periphery of said male member, and extending into a recess in said nut.

3. In a device of the class described, a rotary joint, comprising a socket member having an inwardly extending annular flange; a male member adapted to enter said socket member and provided with an annular extension surrounding said annular flange, said extension fitting the inner wall of said socket member and forming a radial shoulder to said male member; a nut threaded to the outer end of said socket member; a follower surrounding said male member and positioned by said nut, having an annular recess therein; a ring surrounding said male member but free from contact therewith, one end of which contacts with said radial shoulder and the other end of which is positioned within said recess; and a packing ring surrounding said ring between said shoulder and the inner end of said follower.

Signed by me at 4 Post-Office Sq., Boston, Mass., this 7th day of June, 1910.

WARREN A. GREENLAW.

Witnesses:
  NATHAN C. LOMBARD,
  WALTER E. LOMBARD.